Feb. 16, 1965 R. L. TANNER ETAL 3,170,087
STATIC DISCHARGER APPARATUS
Filed July 31, 1961
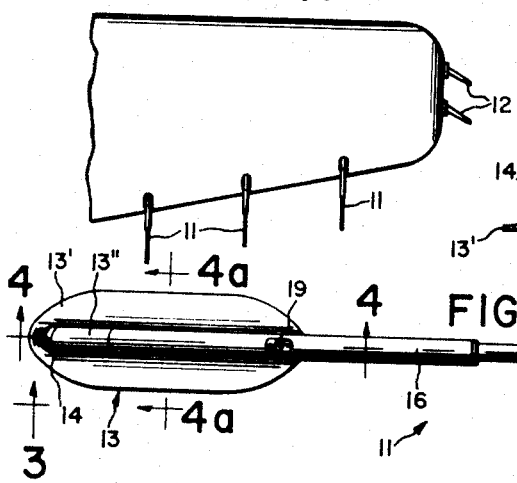
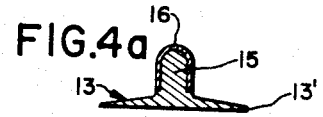
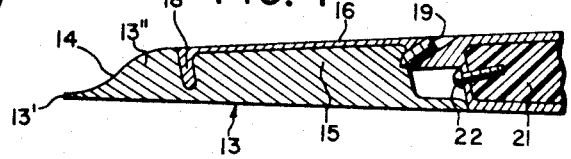
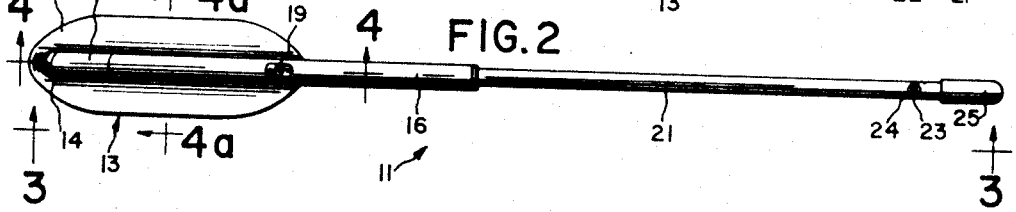
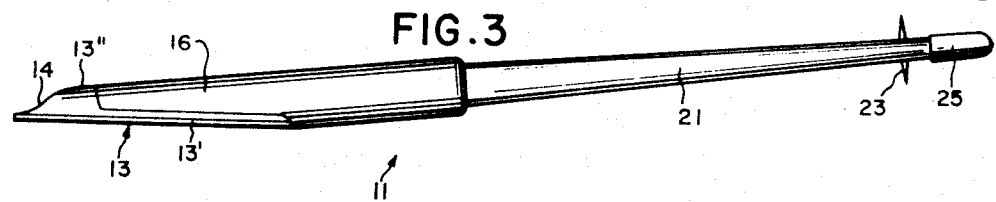
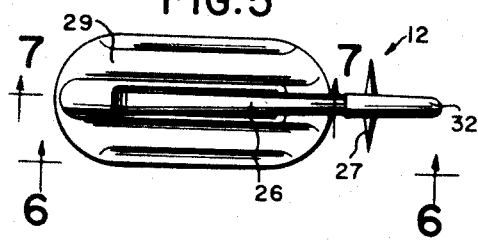
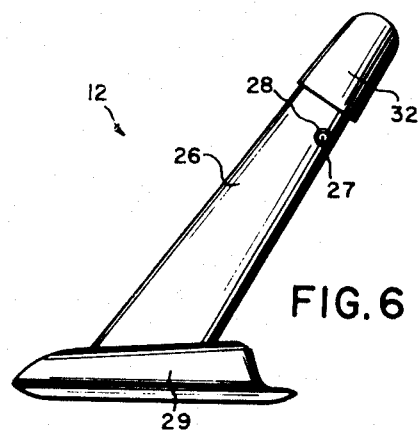
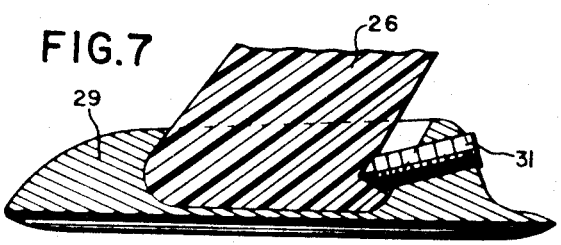
INVENTORS
ROBERT L. TANNER
HUGH D. KENNEDY
LOREN L. RAGLIN
BY *Paul B Hunter*
ATTORNEY

United States Patent Office 3,170,087
Patented Feb. 16, 1965

3,170,087
STATIC DISCHARGER APPARATUS
Robert L. Tanner and Hugh D. Kennedy, Menlo Park, and Loren L. Raglin, Mountain View, Calif., assignors to Granger Associates, Palo Alto, Calif., a corporation of California
Filed July 31, 1961, Ser. No. 128,165
9 Claims. (Cl. 317—2)

The present invention relates in general to static dischargers and more particularly to a novel improved static discharger especially suitable for eliminating precipitation static interference in aircraft or the like.

The precipitation static discharger of this invention is an improved form of the general types of static dischargers forming the subject matter of U.S. Patent No. 2,933,732, issued April 19, 1960, to Robert L. Tanner and the U.S. Patent No. 3,106,663, issued October 8, 1963, to Robert L. Tanner. These static dischargers, which have been very successfully employed in eliminating the precipitation static problem in aircraft, operate on the principle that the region of highest D.-C. field near the charged up aircraft, which is the point at which corona discharge will occur from the moving aircraft, is caused to correspond to the region in which the radio frequency antenna field is near zero, or the region in which the two sets of field lines are at right angles, or preferably both. Corona discharges at such a near zero R.-F. field location will result in the minimum amount of static interference in the antenna. Such static dischargers are employed at the most effective locations on the aircraft, for example, the trailing edges and the tips of the wings and vertical and horizontal stabilizers, resulting in a reduction in corona threshold potential of the aircraft by a factor of from 6 to 15, forcing all corona to occur from the static dischargers rather than from locations on the aircraft which are coupled to the aircraft antennas. Due to these physical locations, the static dischargers are subjected to severe environmental conditions such as snow and rain, wind buffeting, vibrations, etc. In addition, the dischargers extend out from the wing and stabilizer edges and are thus subject to damage during maintenance and the like. Under such conditions, the static dischargers must be strong enough to withstand the most severe environmental conditions and have long life, yet be lightweight, must retain their necessary electrical characteristics, and must be easily and economically fitted to and replaceable on existing and new aircraft.

It is, therefore, the principal object of the present invention to provide a lightweight, long life, easily replaceable precipitation static discharger for use on objects subject to static interference due to corona discharges such as aircraft and under conditions of subsonic or supersonic flight.

One feature of the present invention is the provision of a precipitation static discharger having a strong, lightweight, electrically conductive base member arranged to be permanently affixed to the aircraft and a strong, lightweight, high resistance discharge member arranged to be removably yet securely attached to said base.

Another feature of the present invention is the provision of a precipitation static discharger of the above featured type constructed in such a manner that a continuous, long life, electrically conductive path is sustained under the most adverse operating conditions from the aircraft to the point of corona discharge from the discharge member.

These and other objects and advantages of the present invention will become more apparent from a perusal of the following specification taken in connection with the drawings wherein FIG. 1 is a partial plan view of an airplane wing showing two groups of static dischargers embodying the present invention secured thereto, FIG. 2 is a plan view of one static discharger of the present invention, FIG. 3 is a side elevation view of the discharger shown in FIG. 2, FIG. 4 is a longitudinal cross-sectional view through a portion of the discharger taken along section line 4—4 in FIG. 2, FIG. 4(a) is a cross-sectional view of the discharger taken along section line 4(a)—4(a) in FIG. 2, FIG. 5 is a plan view of another static discharger of the present invention, FIG. 6 is an elevation view of the discharger of FIG. 5, and FIG. 7 is a cross-sectional view of the discharger of FIGS. 5 and 6 taken along section line 7—7 in FIG. 5.

Referring now to FIG. 1, two groups of static dischargers, embodying the present invention are disclosed for illustration purposes, one group 11 being suitable for mounting on the trailing edges of wings and stabilizers and the other group 12 on the tips or extremeties thereof. It should be understood that the exact number and location of the static dischargers is determined by the construction, configuration, etc., of the particular aircraft in accordance with the general principles of such type dischargers set forth in the above cited patent and patent application. One discharger of the group 11 is shown in more detail in FIGS. 2, 3 and 4 and comprises a retainer base 13 of strong, lightweight metal such as aluminum. This retainer base is plated, preferably with an electroless nickel plating, to insure corrosion resistance and to eliminate aluminum-to-aluminum contact, with the resultant formation of an aluminum oxide film, between the retainer base and the wing surface to thus provide high surface conductivity, i.e., low D.-C. resistance between wing and base. The base 13 includes a wide, relatively flat portion 13′ and a narrow riser portion 13″, the wide flat portion 13′ serving as the mounting surface by which the discharger is secured, as by an electrically conducting adhesive, to the wing surface. The relatively large contact area between wing and retainer base insures high electrical conductivity at this junction and large bonding area for highest shear strength. The edges of the base portion 13′ are feathered slightly to distribute the stress, i.e., to prevent stress concentration at the edges of the base portion 13′. The wide surface also permits the static discharger to be fastened to the wing by rivets if desired.

The riser portion 13″ of the base 13 has a rounded front edge 14 to reduce wing drag and a reduced cross-sectional portion 15 which serves as a mount and support pedestal for an electroless nickel plated aluminum retainer cover 16. The base riser 13″ is provided with a slanted slot into which a forward wall 18 of the cover 16 nestles and also a small recess into which the inner end of a set screw 19 fits. The cover 16 is shaped so as to fit snugly over the base portion 15, the set screw 19 serving to pull the wall 18 securely into the slanted slot and the cover 16 down onto the base. The slight incline to the slot results in an increase in the gripping force of the cover 16 on the base 13 with increase in wind drag. The particular shape of the cover 16, i.e., narrow and high with rounded, streamlined forward contour, and flush surface mounting on the retainer base, 13, insures minimum weight and wind-drag surface and yet substantial strength and also sufficient surface contact area between base 13 and cover 16 to insure sufficient electrical conductivity to handle the maximum current flow occurring, for example, in lightening discharges from the aircraft, without welding 13 and 16 together.

A narrow elongated, strong, lightweight plastic precipitation static member 21 made of, for example, nylon, is secured by screw 22 within an elongated cavity in the outer end of the retainer cover 16, this member 21 being arranged to extend out beyond the wing edge as shown in FIG. 1. The static discharge member 21, which itself is not electrically conductive, is coated with a high resistance paint such as an epoxy base containing lamp-black and graphite. The coating extends over the surface of member 21 within the hollow cover 16 and, because the member fits snugly within the cover 16, a large conductive surface junction is formed between the coated member 21 and the cover 16. The substantial extent to which the coated member 21 extends within the cover 16 and the fact that the member 21 and cavity are taper fitted provides a strong and rigid support for the member 21 as well as a good electrical conducting junction. To insure that the resistive coating on the member 21 is not cut or broken along the surface of the member, the surfaces of the member 21 and the cavity in the end of the cover are rounded off to eliminate any sharp edges.

A corona discharge pin 23 of conducting metal such as tungsten with very sharp pointed ends is embedded in the member 21, the pointed ends extending above and below the upper and lower edges or surfaces of the member. Small reservoirs or countersunk arcs 24 are located in the surface of the discharge member 21 where the pin 23 protrudes from the member, these reservoirs being filled with a solidified pool of good conducting metal such as silver to provide a good electrical conducting path between the resistive coating and the pin 23. The outer end of the discharge member 21 is capped with a plastic cover 25 to prevent corona discharges from the end.

It should be noted that the static discharger is mounted on the wing (see FIG. 1) such that the retainer base 13 is secured to the wing surface at the wing edge and the retainer cover 16 extends out over the edge of the wing to insure that the D.-C. corona threshold potential is lower at the outer end of cover 16 than at the wing edge so that lightening discharges will occur at the static discharger. The fact that cover 16 extends out beyond the wing tends to confine lightening damage to the extending cover rather than the adjacent metal wing trailing edge.

The pin 23 is located in the elongated discharge member 21 at a distance from the base 13 which locates the pin at a region of lowest R.-F. antenna field. The resistive coated discharge member provides a region of high D.-C. field at the pin location, corona discharge occurring from the pin points and thus occurring in regions of near zero R.-F. antenna fields and at right angles to any residual R.-F. field lines. A more detailed explanation of the basic principles involved in such zero R.-F. field static dischargers may be found in the above cited patent and patent application.

It should be noted that only the retainer base 13 is secured to the airplane wing in a permanent fashion and that the base is relatively flat, hugging the wing surface, and does not extend out over the edge of the wing. For this reason, the base is relatively protected from physical injury and thus has a long life, especially since it is coated to prevent corrosion. The retainer cover 16 which carries the resistance coated discharge member 21 does extend out over the wing edge and is therefore more subject to being struck and damaged; however, the cover 16 is attached to the base 13 by a single set screw 19 which is positioned for easy access to an airplane maintenance man and thus the cover 16 and discharge member 21 may be easily and rapidly replaced on the wing if damaged. This feature has met with considerable enthusiasm in the aircraft industry.

Referring to FIGS. 5, 6 and 7, this embodiment of the invention is adapted to be mounted on the tips of the wings or stabilizers as shown by the group 12 in FIG. 1. The resistance coated plastic discharge member 26 is narrow to reduce wind drag yet has a realtively large cross-sectional area for strength and rigidity and a large conducting surface area. The metal corona discharge pin 27 is surrounded by conducting metal reservoirs 28 at the surfaces of the discharge member 26. The discharge member 26 is secured within an electroless nickel plated aluminum retainer base 29 by means of a single set screw 31. The base 29 has a large undersurface arranged for securing the base to the wing tip as by cementing with electrically conductive adhesive. The plastic tip cover 32 prevents corona discharge from the end of the member 26. As with the discharger shown in FIGS. 2–4, the discharge member 26 is easily replaceable in the base 29 by means of set screw 31.

We claim:

1. A precipitation static discharger comprising a retainer base adapted to be secured to the object to be discharged, said base having a large surface area for physical and electrical contact with said object, an elongated electrically non-conductive discharge member having a distributed high resistance electrically conductive coating thereon arranged to be removably secured to said retainer base at one end of said discharge member with said coating electrically coupled to said retainer base, a metallic electrically conductive corona discharge pin secured in said discharge member and extending entirely through said discharge member transverse to the axis thereof with two sharp pointed ends extending therefrom on either side and at a position spaced apart from said retainer base, said coated discharge member being provided with a reservoir at the place where said pin extends from the discharge member and a solidified pool of electrically conductive material positioned in said reservoir to provide a good electrically conductive path between said resistive coating and said pin, thereby provide a corona discharge point from said static discharger and an electrically non-conductive cap covering the free end of said discharge member.

2. A precipitation static discharger as claimed in claim 1 wherein said retainer base is made of electroless nickel plated aluminum.

3. A precipitation static discharger as claimed in claim 1 wherein said high resistance electrically conductive coating is an epoxy base paint containing lampblack and graphite.

4. A precipitation static discharger as claimed in claim 1 wherein said reservoir material is silver.

5. A precipitation static discharger as claimed in claim 1 wherein said high resistance electrically conductive coating is an epoxy base paint containing lampblack and graphite and wherein said reservoir material is silver.

6. A precipitation static discharger as claimed in claim 5 wherein said retainer base is made of electroless nickel plated aluminum.

7. A precipitation static discharger comprising a retainer base adapted to be fixedly secured to the object to be discharged, said base having a large surface area for physical and electrical contact with said object, an elongated retainer base cover having a cavity in one end wherein an elongated electrically non-conducting discharge member having a distributed high resistance electrically conductive coating thereon is fixedly secured, said retainer base cover being arranged at its other end for removably securing said cover to said base whereby an electrical path is completed from the object through the base and cover to said resistive coating, a metallic electrically conductive corona discharge pin secured in said discharge member and extending entirely through said discharge member transverse to the axis thereof with two sharp pointed ends extending therefrom on either side and at a position spaced-apart from said cover and base, said coated discharge member being provided with a reservoir at the place where said pin extends from the discharge member and a solidified pool of electrically conductive material positioned in said reservoir to provide a good electrically conductive path between said resistive coating and said pin to thereby provide a corona discharge point from said static discharger and an electrically non-conductive cap covering the free end of said discharge member.

8. A precipitation static discharger as claimed in claim 7 wherein said retainer base is made of electroless nickel plated aluminum and said high resistance electrically conductive coating is an epoxy base paint containing lampblack and graphite.

9. A precipitation static discharger as claimed in claim 7 wherein said elongated retainer base cover is secured to said retainer base at one end, the other end extending out from said base such that said cover absorbs lightening discharges before such discharges can reach the structure on which said base is secured.

References Cited by the Examiner
UNITED STATES PATENTS

| | | | |
|---|---|---|---|
| 2,466,311 | 4/49 | Hall | 317—2 |
| 2,536,818 | 1/51 | Lawton | 317—2 |
| 2,833,849 | 5/58 | Abel | 343—888 |
| 2,933,732 | 4/60 | Tanner | 317—2 |
| 3,034,020 | 5/62 | Benkoczy et al. | 317—2 |

SAMUEL BERNSTEIN, *Primary Examiner.*